Nov. 20, 1962
J. L. HUFFMAN ETAL
3,065,380
CONTINUITY RING
Filed Dec. 1, 1959
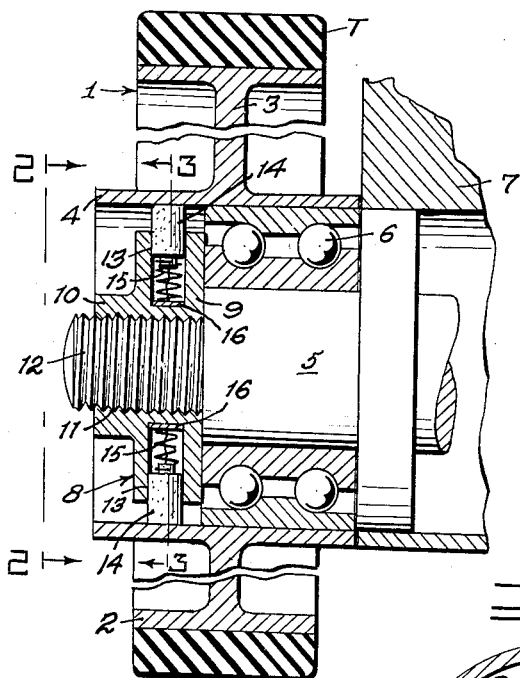
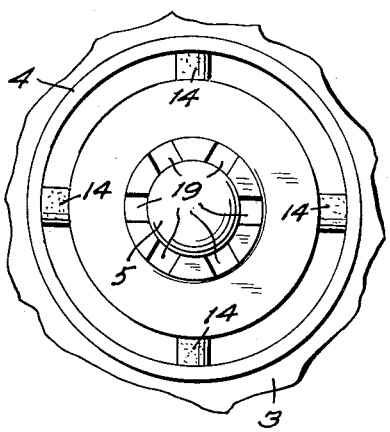
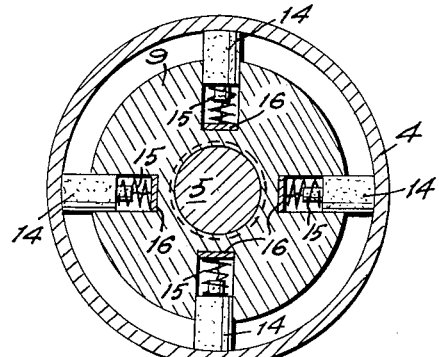
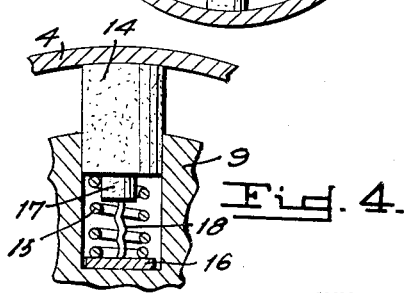
INVENTOR.
J Lauton Huffman
BY Joseph R. Williams
S.J. Rotondi & A.J. Dupont United States Patent Office 3,065,380
Patented Nov. 20, 1962

3,065,380
CONTINUITY RING
J Lauton Huffman, Frostburg, Md., and Joseph R. Williams, Salt Lake City, Utah, assignors to the United States of America as represented by the Secretary of the Army
Filed Dec. 1, 1959, Ser. No. 856,629
2 Claims. (Cl. 317—2)

This invention relates to a continuity ring, and more particularly to a means for collecting and dissipating a charge of static electricity built up upon tires or wheels of small trucks such as are employed in powder factories, powder loading plants or in the vicinity of explosive material which might be set off by a spark.

Usually wheels used on the small trucks or of insulating material such as rubber, etc., to eliminate danger of sparking if the wheels were of cast iron, steel or other metal. These wheels, however, do not provide a means for discharging static electricity that is built up on the tires, rims, spokes and hubs by the flexing of the rubber, especially during dry atmospheric conditions. If this charge is allowed to remain, it will build up until it discharges to a ground, such as the truck frame and a spark will be made.

The central portion or hub of the wheel is secured to the axle and from lubrication of the bearing surfaces there forms a film between the axle and bearing surfaces which tends to insulate the wheel from the truck frame and prevents the charge from leaking off to the frame and prevent sufficiently high potential to cause a spark.

Attemps have been made to devise suitable means to eliminate this danger. Such attempts include drag links, wheels having copper wire imbedded therein, spring wipers, etc. None of these devices were satisfactory for use in a truck wheel.

The present invention provides a continuity ring assuring absolute continuity or conductivity of any part of the wheel or truck. The ring comprises a metallic ring constituting the wheel nut and is provided with radially disposed, spring biased brushes wiping the inner periphery of the wheel hub. The brush is electrically connected to a copper cap which is biased against the inner end of the bore in which the brush slides.

It is therefore a primary object of this invention to provide a continuity ring to collect and dissipate a charge of static electricity built up on the wheels and tires of a vehicle used in powder plants and the like.

It is another object of this invention to provide a device for dissipating a charge of static electricity housed in a wheel retaining member.

It is a further object of this invention to provide a static electricity dissipator comprising a series of spring biased collecting brushes adapted to wipe against the inner periphery of a wheel hub whereby the static charge will be transferred from the wheel of a vehicle to the vehicle frame.

It is a still further object of the invention to provide a conducting member connected between the collecting brush of a static electricity dissipator and a spring biased disc which is biased against the body of the dissipator.

A final object of the invention is to provide an economical, reliable and simple device to dissipate static electricity built up on the wheel of a vehicle.

The specific nature of the invention, as well as other objects and advantages thereof, will be apparent from the following description of the preferred embodiment thereof as illustrated in the accompanying drawings, forming part of the specification, in which like numerals are used to designate like parts through the same.

In the drawings,

FIG. 1 is an axial section view taken through a continuity ring constructed in accordance with the invention and mounted on an axle of a truck;

FIG. 2 is a front elevation of the device of FIG. 1 and looking in the direction of lines 2—2 of FIG. 1;

FIG. 3 is a cross sectional view taken along lines 3—3 of FIG. 1, and

FIG. 4 is a greatly enlarged sectional detail view of one of the brush units.

Referring now to the drawing, 1 indicates generally a wheel such as is used on small trucks and the like and defines a rim portion 2, spoke 3 and a hub 4. (The wheel 1 may be provided with tires T.)

Wheel 1 is mounted on axle 5 by bearing 6. Axle 5 is carried by truck frame, or like support 7, a portion of which is shown in FIG. 1. The wheel 1, axle 5, bearing 6 and frame 7, tire T form no part of this invention and are shown by way of illustration only.

The continuity ring, constituting the grounding nut of the invention is indicated generally by 8 and, as shown in FIG. 1, comprises a disc portion 9 having a cylindrical boss 10 integrally formed on one of its sides. Ring 8 is provided with an internally threaded central bore 11 and is adapted to be screwed on an externally threaded portion 12 of axle 5 and acts therefore as the retaining nut for wheel 1. The disc portion 9 is provided with a series of symmetrically spaced radial bores 13. Bores 13 extend a substantial distance in ring 8, but end short of the threaded bore 11.

Slidably mounted in bores 11, are carbon brushes 14 which are biased outwardly by springs 15. Springs 15 bias at their outer ends against carbon brush 14 and a copper cap or disc 16. The outer end of spring 15 encircles a reduced portion 17 formed on the inner end of brush 14. A wire 18 is connected by suitable means to brush 14 and disc 16, completing a lead from brush 14 to disc 16 which is pressed against the inner wall of bore 13 to provide electrical contact between brush 14 and ring 8.

Boss 10 is provided with radial slots 19 for insertion of a wrench or the like for attaching or removing ring 8.

When in assembled relation, as shown best in FIGURE 1, brushes 14 wipe against the inner peripheral surface of wheel hub 4. Thus, any static electricity built up on wheel 1 is dissipated to axle 5 and frame 7 thereby by-passing the bearings 6 which are usually coated with a film of lubricant.

It is apparent from the foregoing description, that a reliable means has been designed for dissipating a charge of static electricity that is built up on a wheel of a vehicle to its frame and is not hindered by the presence of insulating grease film on the wheel bearings.

It is to be understood that the form of the invention, herein shown and described, is to be taken as a preferred example of the same, and that various changes in the shape, size and arrangement of parts may be resorted to, without departing from the spirit of my invention, or the scope of the subjoined claims.

What is claimed is:

1. A wheel assembly including a frame, an axle carried by said frame and a wheel having rim and hub portions rotatably mounted on said axle, a fastening member adapted to secure said wheel on said axle and means housed in said fastening member, for continuously conducting static electrical charges from said wheel to said frame comprising, a plurality of spring loaded, symmetrically spaced, electrical conductors slidably mounted in radial arrangement in said fastening member and continuously contacting the inner peripheral surface of said hub portion of said wheel.

2. In a wheel assembly, the combination including a frame, an axle having a reduced externally threaded portion, a wheel bearing assembly mounted on said axle and a wheel having rim and hub portions mounted for rotation on said bearing assembly; means for securing said wheel and said bearing assembly on said axle comprising, a cylindrical nut having a reduced portion on its outer end thereof, there being a series of radial slots in the outer face of said reduced portion for the insertion of a tool therein, said nut having a axial, internally threaded bore adapted to threadably mount said nut on said externally threaded reduced portion of said axle; and means housed in said cylindrical nut for continuously conducting static electricity from said wheel to be dissipated in said frame comprising, a plurality of symmetrically arranged radial bores extending a substantial distance into said cylindrical nut, from its outer circumference thereof, an electrical conducting brush defining a reduced inner portion, a flat disc slidably mounted in each said bore, a coil spring in each said bore and disposed between a said flat disc and encircling said reduced portion of a respective brush whereby said brush is urged outwardly to contact the inner peripheral surface of said hub of said wheel and an electrical lead connecting a said brush and a said flat disc.

References Cited in the file of this patent

UNITED STATES PATENTS

| | | |
|---|---|---|
| 1,811,180 | Landers | June 23, 1931 |
| 1,896,265 | Weichsel | Feb. 7, 1933 |
| 2,104,800 | Grandy | Jan. 11, 1938 |
| 2,256,118 | Kyropoulos | Sept. 16, 1941 |
| 2,359,623 | Coxon | Oct. 3, 1944 |
| 2,521,574 | Findley | Sept. 5, 1950 |